(12) United States Patent
Mondal et al.

(10) Patent No.: US 9,807,838 B1
(45) Date of Patent: Oct. 31, 2017

(54) SYSTEM AND METHOD FOR PROVIDING DOWNLOADABLE CUSTOM LED BLINKING PATTERN FOR BACKPLANE CONTROLLER OR ENCLOSURE MANAGEMENT CONTROLLER

(71) Applicant: American Megatrends, Inc., Norcross, GA (US)

(72) Inventors: Umasankar Mondal, Snellville, GA (US); Shibu Abraham, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 15/434,823

(22) Filed: Feb. 16, 2017

(51) Int. Cl.
  *H05B 33/08* (2006.01)
  *H04L 29/08* (2006.01)
(52) U.S. Cl.
  CPC ......... *H05B 33/0845* (2013.01); *H04L 67/06* (2013.01)
(58) Field of Classification Search
  CPC .... H05B 37/02; H05B 33/08; H05B 33/0845; H04L 67/06; G06F 11/3051; G06F 13/385; G06F 13/4072; G06F 13/426
  USPC .... 315/185 R, 112, 113, 117, 118, 130–132, 315/151–153, 291, 307, 308, 312, 313
  See application file for complete search history.

(56) References Cited

U.S. PATENT DOCUMENTS

| | | | |
|---|---|---|---|
| 8,332,567 B2 * | 12/2012 | Burr | G05B 19/042 710/25 |
| 2007/0288967 A1 * | 12/2007 | Candelore | H04N 5/913 725/50 |

\* cited by examiner

*Primary Examiner* — Jimmy Vu
(74) *Attorney, Agent, or Firm* — Locke Lord LLP; Tim Tingkang Xia, Esq.

(57) ABSTRACT

Systems and methods providing a downloadable custom light emitting diode (LED) blinking pattern for a controller, which performs backplane or enclosure management. The controller has a memory, which stores data of a standard LED blinking pattern. When no custom LED blinking pattern data is available in the memory, the controller controls the LEDs to perform a standard blinking pattern based on the standard LED blinking pattern data to indicate the of the storage drives. A user may generate a custom pattern file, which contains custom LED blinking pattern data, and then use a downloading tool to download the custom pattern file to the controller, such that the memory of the controller may store the custom LED blinking pattern data. Instead of using the standard LED blinking pattern, the controller may then control the LEDs to perform a custom blinking pattern based on the custom LED blinking pattern data.

20 Claims, 8 Drawing Sheets

| 500 | Word Number | 16-bit HEX | Binary Byte 1 | Binary Byte 0 | States |
|---|---|---|---|---|---|
| | 16-bit Word 0 | AAAA | 10101010 | 10101010 | UNMATED_Common Activity(GREEN) |
| | 16-bit Word 1 | 0000 | 00000000 | 00000000 | Locate_state_GREEN_LED |
| | 16-bit Word 2 | 0000 | 00000000 | 00000000 | Locate_state_RED_LED |
| | 16-bit Word 3 | CCCC | 11001100 | 11001100 | Locate_state_AMBER_LED |
| | 16-bit Word 4 | 0000 | 00000000 | 00000000 | FAIL_state_GREEN_LED |
| | 16-bit Word 5 | FFFF | 11111111 | 11111111 | FAIL_state_RED_LED |
| | 16-bit Word 6 | 0000 | 00000000 | 00000000 | FAIL_state_AMBER_LED |
| | 16-bit Word 7 | 0000 | 00000000 | 00000000 | REBUILD_state_GREEN_LED |
| | 16-bit Word 8 | 0000 | 00000000 | 00000000 | REBUILD_state_RED_LED |
| | 16-bit Word 9 | F0F0 | 11110000 | 11110000 | REBUILD_state_AMBER_LED |
| | 16-bit Word 10 | 0000 | 00000000 | 00000000 | PFA_state_GREEN_LED |
| Blink pattern Unmated | 16-bit Word 11 | 0F0F | 00001111 | 00001111 | PFA_state_RED_LED |
| | 16-bit Word 12 | F0F0 | 11110000 | 11110000 | PFA_state_AMBER_LED |
| | 16-bit Word 13 | 0000 | 00000000 | 00000000 | HOT-SPARE_state_GREEN_LED |
| | 16-bit Word 14 | 0000 | 00000000 | 00000000 | HOT-SPARE_RED_LED |
| | 16-bit Word 15 | 0000 | 00000000 | 00000000 | HOT-SPARE_AMBER_LED |
| | 16-bit Word 16 | 0000 | 00000000 | 00000000 | ICA_state_GREEN_LED |
| | 16-bit Word 17 | 0000 | 00000000 | 00000000 | ICA_state_RED_LED |
| | 16-bit Word 18 | 0000 | 00000000 | 00000000 | ICA_state_AMBER_LED |
| | 16-bit Word 19 | 0000 | 00000000 | 00000000 | IFA_state_GREEN_LED |
| | 16-bit Word 20 | 0000 | 00000000 | 00000000 | IFA_state_RED_LED |
| | 16-bit Word 21 | 0000 | 00000000 | 00000000 | IFA_state_AMBER_LED |
| | 16-bit Word 22 | 0000 | 00000000 | 00000000 | NULL_state_GREEN_LED |
| | 16-bit Word 23 | 0000 | 00000000 | 00000000 | NULL_state_RED_LED |
| | 16-bit Word 24 | 0000 | 00000000 | 00000000 | NULL_state_AMBER_LED |
| | 16-bit Word 25 | 0082 | 00000000 | 10000010 | IGNORE_ACTIVITY_Unmated |
| | 16-bit Word 26 | AAAA | 10101010 | 10101010 | MATED_Common Activity(GREEN) |
| | 16-bit Word 27 | 0000 | 00000000 | 00000000 | Locate_state_GREEN_LED |
| | 16-bit Word 28 | 0000 | 00000000 | 00000000 | Locate_state_RED_LED |
| | 16-bit Word 29 | CCCC | 11001100 | 11001100 | Locate_state_AMBER_LED |
| | 16-bit Word 30 | 0000 | 00000000 | 00000000 | FAIL_state_GREEN_LED |
| | 16-bit Word 31 | FFFF | 11111111 | 11111111 | FAIL_state_RED_LED |
| | 16-bit Word 32 | 0000 | 00000000 | 00000000 | FAIL_state_AMBER_LED |
| | 16-bit Word 33 | 0000 | 00000000 | 00000000 | REBUILD_state_GREEN_LED |
| | 16-bit Word 34 | 0000 | 00000000 | 00000000 | REBUILD_state_RED_LED |
| | 16-bit Word 35 | F0F0 | 11110000 | 11110000 | REBUILD_state_AMBER_LED |
| | 16-bit Word 36 | 0000 | 00000000 | 00000000 | PFA_state_GREEN_LED |
| Blink pattern Mated | 16-bit Word 37 | 0F0F | 00001111 | 00001111 | PFA_state_RED_LED |
| | 16-bit Word 38 | F0F0 | 11110000 | 11110000 | PFA_state_AMBER_LED |
| | 16-bit Word 39 | 0000 | 00000000 | 00000000 | HOT-SPARE_state_GREEN_LED |
| | 16-bit Word 40 | 0000 | 00000000 | 00000000 | HOT-SPARE_state_RED_LED |
| | 16-bit Word 41 | FFFF | 11111111 | 11111111 | HOT-SPARE_AMBER_LED |
| | 16-bit Word 42 | 0000 | 00000000 | 00000000 | ICA_state_GREEN_LED |
| | 16-bit Word 43 | 0000 | 00000000 | 00000000 | ICA_state_RED_LED |
| | 16-bit Word 44 | 0000 | 00000000 | 00000000 | ICA_state_AMBER_LED |
| | 16-bit Word 45 | 0000 | 00000000 | 00000000 | IFA_state_GREEN_LED |
| | 16-bit Word 46 | 0000 | 00000000 | 00000000 | IFA_state_RED_LED |
| | 16-bit Word 47 | FFFF | 11111111 | 11111111 | IFA_state_AMBER_LED |
| | 16-bit Word 48 | 0000 | 00000000 | 00000000 | NULL_state_GREEN_LED |
| | 16-bit Word 49 | 0000 | 00000000 | 00000000 | NULL_state_RED_LED |
| | 16-bit Word 50 | FFFF | 11111111 | 11111111 | NULL_state_AMBER_LED |
| | 16-bit Word 51 | 0002 | 00000000 | 00000010 | IGNORE_ACTIVITY_Mated |
| | 16-bit Word 52 | 9098 | 10010000 | 10011000 | CHIP_ID |
| | 16-bit Word 53 | XXXX | | | CHECK_BITS |

FIG. 5

SYSTEM AND METHOD FOR PROVIDING DOWNLOADABLE CUSTOM LED BLINKING PATTERN FOR BACKPLANE CONTROLLER OR ENCLOSURE MANAGEMENT CONTROLLER

FIELD

The present disclosure relates generally to backplane and enclosure management technology, and more particularly to systems and methods for providing downloadable custom light emitting diode (LED) blinking patterns for a controller, such as a backplane controller or an enclosure management controller, to display storage states.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a data center with large amount of storage space, a backplane may be used to mount a number of storage drives in an enclosure. To management the operation of the backplane system, a backplane (BP) controller or an enclosure management (EM) controller may be provided. Generally, in a BP controller or an EM controller, LEDs are used to display the drive activity and status. In this case, the BP controller or the EM controller may store data of a standard LED blinking pattern, which is used to control the LED blinking signals that represents the drive activity and status. However, customers who purchase the BP controller or the EM controller constantly request custom blinking patterns.

Therefore, an unaddressed need exists in the art to address the aforementioned deficiencies and inadequacies.

SUMMARY

Certain aspects of the disclosure direct to a method of providing a downloadable custom light emitting diode (LED) blinking pattern for a controller, which includes: providing a backplane enclosure system including: a controller, including a processor and a memory; a plurality of storage drives electrically connected to and controlled by the controller; a plurality of LEDs electrically connected to the controller, wherein each of the LEDs is controlled by the controller to be switchable between an ON state and an OFF state such that the LEDs are configured to perform blinking to indicate a plurality of states of the storage drives; and a computing device communicatively connected to the controller via a communication interface; receiving, by a conversion module of the computing device, a plurality of inputs representing custom LED blinking pattern data; converting, by the conversion module of the computing device, the inputs to a custom pattern file containing the custom LED blinking pattern data; receiving, by a downloading module of the controller, the custom pattern file from the computing device via the communication interface; storing, by the downloading module of the controller, the custom pattern file in the memory; and controlling, by the controller, the LEDs to perform a custom blinking pattern based on the custom LED blinking pattern data in the custom pattern file.

In certain embodiments, the communication interface is a SES I2C bus, a PCIe bus, or a communication bus.

In certain embodiments, the controller is a microcontroller based controller, a complex programmable logic device (CPLD) based controller, a field-programmable gate array (FPGA) based controller, or any combination thereof.

In certain embodiments, the custom pattern file includes: the custom LED blinking pattern data; chip identification data of the controller; and checkbits data used for checksum verification of the custom pattern file.

In certain embodiments, the memory stores default standard LED blinking pattern data, and the method further includes: controlling, by the controller, the LEDs to perform a standard blinking pattern based on the default standard LED blinking pattern data when the custom pattern file is unavailable in the memory.

In certain embodiments, the memory defines a plurality of memory blocks, comprising: a first memory block storing the default standard LED blinking pattern data; and a second memory block configured to store the custom pattern file. In certain embodiments, the controller is configured to control the LEDs by: checking the second memory block to determine whether the custom pattern file is available in the second memory block; when the custom pattern file is available in the second memory block, validating the custom pattern file; when the custom pattern file is validated, controlling the LEDs to perform the custom blinking pattern based on the custom pattern file stored in the second memory block; and when the custom pattern file is unavailable in the second memory block, or when the custom pattern file is not successfully validated, controlling the LEDs to perform the standard blinking pattern based on the default standard LED blinking pattern data stored in the first memory block.

In certain embodiments, the memory comprises one memory block storing the default standard LED blinking pattern data, and the controller is configured to store the custom pattern file in the one memory block to replace the standard LED blinking pattern data.

In certain embodiments, the controller is an enclosure management controller or a backplane controller.

Certain aspects of the disclosure direct to a system, which includes: a controller comprising a processor and a memory storing computer executable code; a plurality of storage drives electrically connected to and controlled by the controller; and a plurality of light emitting diodes (LEDs) electrically connected to the controller, where each of the LEDs is controlled by the controller to be switchable between an ON state and an OFF state such that the LEDs are configured to perform blinking to indicate a plurality of states of the storage drives. The computer executable code, when executed at the processor, is configured to: receive a custom pattern file containing custom LED blinking pattern data; store the custom pattern file in the memory; and control the LEDs to perform a custom blinking pattern based on the custom LED blinking pattern data in the custom pattern file.

In certain embodiments, the system further includes a computing device communicatively connected to the controller via a communication interface, wherein the computing device comprises a conversion module configured to: receive a plurality of inputs representing the custom LED blinking pattern data; and convert the inputs to the custom pattern file.

In certain embodiments, the controller is a microcontroller based controller, a complex programmable logic device (CPLD) based controller, a field-programmable gate array (FPGA) based controller, or any combination thereof.

In certain embodiments, the custom pattern file includes: the custom LED blinking pattern data; chip identification data of the controller; and checkbits data used for checksum verification of the custom pattern file.

In certain embodiments, the memory stores default standard LED blinking pattern data, and the computer executable code is further configured to: control the LEDs to perform a standard blinking pattern based on the default standard LED blinking pattern data when the custom pattern file is unavailable in the memory.

In certain embodiments, the memory defines a plurality of memory blocks, comprising: a first memory block storing the standard LED blinking pattern data; and a second memory block configured to store the custom LED blinking pattern data, wherein the computer executable code is configured to control the LEDs by: checking the second memory block to determine whether the custom pattern file is available in the second memory block; when the custom pattern file is available in the second memory block, validating the custom pattern file; when the custom pattern file is validated, controlling the LEDs to perform the custom blinking pattern based on the custom pattern file stored in the second memory block; and when the custom pattern file is unavailable in the second memory block, or when the custom pattern file is not successfully validated, controlling the LEDs to perform the standard blinking pattern based on the default standard LED blinking pattern data stored in the first memory block.

Certain aspects of the disclosure direct to a system, which includes: a backplane enclosure, comprising a plurality of light emitting diodes (LEDs) and a controller configured to control blinking of the LEDs; and a computing device communicatively connected to the controller via a communication interface. The computing device a processor and a storage device storing a conversion module, wherein the conversion module, when executed at the processor of the computing device, is configured to: receive a plurality of inputs representing custom LED blinking pattern data; and convert the inputs to a custom pattern file containing the custom LED blinking pattern data, such that the custom pattern file is downloadable to the controller to control blinking of the LEDs.

In certain embodiments, the controller comprises a processor and a memory storing computer executable code, wherein the computer executable code, when executed at the processor of the controller, is configured to: receive the custom pattern file from the computing device via the communication interface; store the custom pattern file in the memory; and control the LEDs to perform a custom blinking pattern based on the custom LED blinking pattern data in the custom pattern file.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 5 schematically depicts the data structure of a custom pattern file according to certain embodiments of the present disclosure.

DETAILED DESCRIPTION

Figure 1:
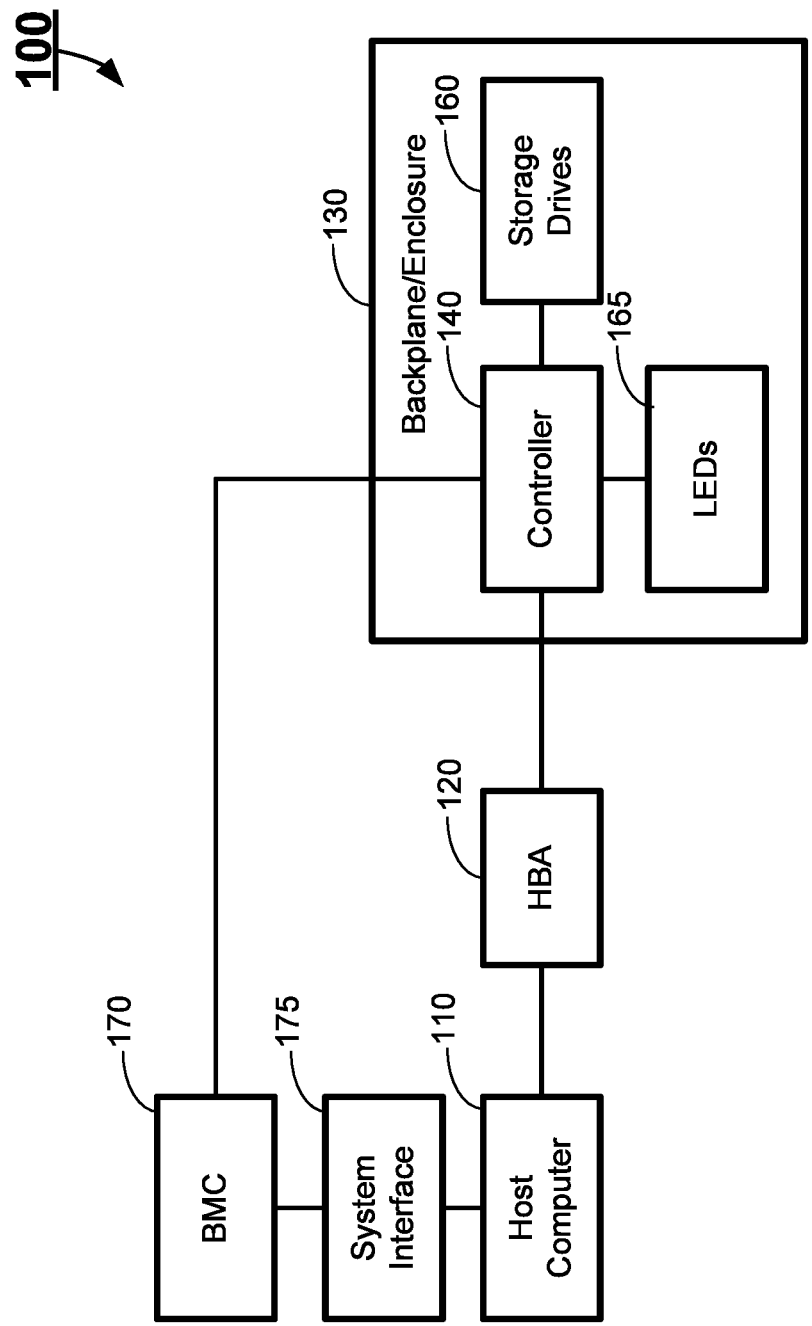
FIG. 1 schematically depicts a block diagram of a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In a backplane or enclosure management system, the BP controller or the EM controller may store data of a standard LED blinking pattern, which is used to control the LED blinking signals that represents the states of the storage devices. For example, the standard LED blinking pattern may follow the International Blinking Pattern Interpretation (IBPI) standard, which is an internal computer hardware standard that defines, among other things, how the LEDs on a backplane should represent the states for drives on the backplane. The IBPI standard was defined by the SFF-8489 Specification of the Small Form Factor (SFF) Special Interest Group in 2011. However, as described above, customers who purchase the BP controller or the EM controller generally do not use the standard LED blinking pattern under the IBPI standard, and constantly request custom blinking patterns.

In order to meet the customers' requests, vendors or manufacturers of the BP/EM controller may provide the custom blinking patterns being requested in the firmware of the BP/EM controller. However, the memory space in the BP/EM controller for storing the firmware is limited to accommodate customer preferred blinking patterns. Thus, there is a need of some tools to generate downloadable custom LED blinking patterns for a controller, such as a backplane controller or an enclosure management controller, and to download the patterns being generated to the controller in order to display storage states.

In view of the aforementioned problems, certain aspects of the disclosure relate to a system for providing downloadable custom light emitting diode (LED) blinking patterns for a controller. FIG. 1 schematically depicts a block diagram of a system according to certain embodiments of the present disclosure. As shown in FIG. 1, the system 100 includes a host computer 110, a host bus adapter (HBA) 120, and a backplane/enclosure 130. In particular, the backplane/enclosure 130 includes a controller 140 installed therein, and a plurality of storage drives 160 and a plurality of LEDs 165 being connected to the controller 140. Further, the host computer 110 is connected to a baseboard management controller (BMC) 170 via a system interface 175. The BMC 180 is also connected to the controller 140 of the backplane 130. In certain embodiments, the system 100 may include other components not shown in the figure.

The host computer 110 is a computing device functioning as a host to the controller 130 and the BMC 180. In certain embodiments, the host computer 110 may be a general purpose computer, a specialized computer, or a headless computer. In certain embodiments, each of the controller 130 and the BMC 180 may be respectively communicatively connected to more than one computing device, and one or more of these computing devices may function as the host computer 110 for the controller 130 and the BMC 180.

Figure 2:
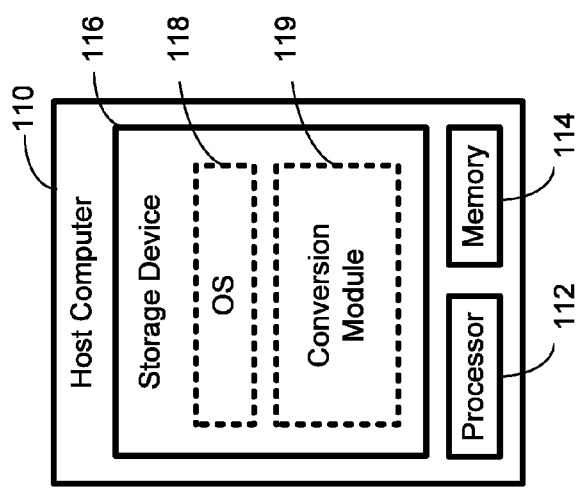
FIG. 2 schematically depicts a block diagram of the host computer according to certain embodiments of the present disclosure.

FIG. 2 schematically depicts a block diagram of the host computer according to certain embodiments of the present disclosure. As shown in FIG. 2, the host computer includes a processor 112, a memory 114, and a storage device 116 storing an operating system (OS) 118 and a conversion module 119.

The processor 112 is the processing core of the host computer 110, configured to control operation of the host computer 110. In certain embodiments, the processor 112 may be a central processing unit (CPU). In certain embodiments, the processor 112 may execute any computer executable code or instructions stored in the storage device 116 of the host computer 110, such as the OS 118 and the conversion module 119. In certain embodiments, the host computer 110 may run on more than one processor 112, such as two processors, four processors or eight processors.

The memory 114 can be a volatile memory, such as the random-access memory (RAM), for storing the data and information during the operation of the host computer 110. In certain embodiments, the memory 114 may be a volatile memory array. In certain embodiments, the host computer 110 may run on more than one memory 114.

The storage device 116 is a non-volatile data storage media for storing the necessary computer executable code and applications of the host computer 110, such as the OS 118 and the conversion module 119. In certain embodiments, the computer executable code or instructions of the host computer 110 may be implemented as one or more application programs or modules. Examples of the storage device 116 may include non-volatile memory such as flash memory, memory cards, hard drives, floppy disks, optical drives, or any other types of data storage devices. In certain embodiments, the host computer 110 may have multiple storage devices 116, which may be identical storage devices or different types of storage devices, and the computer executable code or instructions of the host computer 110 may be stored in one or more of the storage devices 116 of the host computer 110.

The OS 118 includes a set of functional programs that control and manage operations of the host computer 110. In certain embodiments, the OS 118 may receive and manage the simulated signals from components of the host computer 110. The OS 118 may not realize that it is running on virtual machine and may perceive that it is running on a physical machine. In certain embodiments, the OS 118 is operable to multitask, i.e., execute computing tasks in multiple threads. In certain embodiments, the OS 118 may be any of the following: MICROSOFT CORPORATION's "WINDOWS 95," "WINDOWS CE," "WINDOWS 98," "WINDOWS 2000," "WINDOWS NT," "WINDOWS Vista," "WINDOWS 7," "WINDOWS 8," "WINDOWS 10" operating systems, IBM's OS/2 WARP, APPLE's MACINTOSH OSX operating system, LINUX, UNIX, or any other operating systems.

The conversion module 119 is a computer program designed to generate a custom pattern file, which includes data of a custom LED blinking pattern, as commonly requested by the customer. In certain embodiments, a user (e.g., the customer) may execute the conversion module 119 and provide a plurality of inputs, which represents the custom LED blinking pattern data. In response to the inputs, the conversion module 119 may convert the inputs to a custom pattern file containing the custom LED blinking pattern data. Details of the conversion module 119 may be elaborated later.

Referring back to FIG. 1, the HBA 120 is a device to enable communication between the host computer 110 and other network and storage devices, such as the backplane/enclosure 130 controlling the storage drives 160. In certain embodiments, the HBA 120 may have a controller, one or more interfaces for communication with the host computer 110, and one or more interfaces for communication with the controller 140. Generally, the type of the interfaces being used for communications with the host computer 110 and with the controller 140 may be the same, or may be different. For example, the HBA 120 may provide multiple interfaces, such as a PCIe bus, a SGPIO bus, a SES I2C bus, or any other types of communication bus for communication with the host computer 110 and the controller 140. Each of the interfaces that may be utilized by the HBA 120 may adapt to a particular standard, such as Small Computer System Interface (SCSI), Fibre Channel, external Serial AT Attachment (eSATA), Parallel AT Attachment (PATA), Integrated Drive Electronics (IDE), universal serial bus (USB), Ethernet, or any other type of interfaces. For example, the HBA 120 may include interfaces such as PCIe bus, SES bus, I2C bus, MCTP bus, etc.

The controller 140 is a controller controlling the operation of the backplane/enclosure 130. In certain embodiments, the controller 140 may be a backplane controller or an enclosure management controller. In certain embodiments, examples of the controller 140 may include a microcontroller based controller, a complex programmable logic device (CPLD) based controller, a field-programmable gate array (FPGA) based controller, or any combination thereof.

Figure 3:
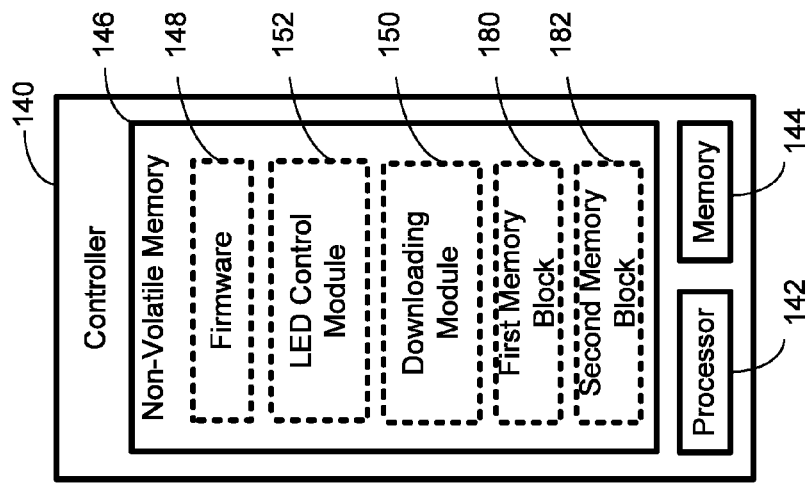
FIG. 3 schematically depicts a block diagram of the controller according to certain embodiments of the present disclosure.

FIG. 3 schematically depicts a block diagram of the controller according to certain embodiments of the present disclosure. As shown in FIG. 3, the controller 140 includes a processor 142, a volatile memory 144, and a non-volatile memory 146 storing necessary computer executable code and applications of the controller 140, such as firmware 148, a downloading module 150 and a LED control module 152.

The processor 142 is the processing core of the controller 140, configured to control operation of the controller 140. In certain embodiments, the processor 142 may execute any computer executable code or instructions stored in the non-volatile memory 146 of the controller 140, such as the firmware 148 and the downloading module 149. In certain embodiments, the controller 140 may run on more than one processor 142, such as two processors, four processors or eight processors.

The volatile memory 144 can be the random-access memory (RAM) for storing the data and information during the operation of the controller 140. In certain embodiments, the controller 140 may run on more than one volatile memory 144.

The non-volatile memory 146 is a non-volatile data storage media for storing the necessary computer executable code and applications of the controller 140, such as the firmware 148. Examples of the non-volatile memory 146 may include flash memory, non-volatile random-access memory (NVRAM), memory cards, USB drives, or any other types of data storage devices suitable for the controller 140. In certain embodiments, the controller 140 may run on more than one non-volatile memory 146.

The firmware 148 stored in the non-volatile memory 146 includes the computer executable code that may be executed at the processor 142 to enable the operations of the controller 140. In certain embodiments, the firmware 148 may include one or more modules or software components that may be executed independently. In certain embodiments, the downloading module 150 and the LED control module 152 may be a part of the firmware 148. In certain embodiments, each of the downloading module 150 and the LED control module 152 may respectively be a separate software module independent from the firmware 148.

The downloading module 150 is a software application configured to download the custom pattern file, which is generated by the conversion module 119 at the host computer 110, to the controller 140. In particular, when the conversion module 119 at the host computer 110 generates the custom pattern file, a user may execute the downloading module 150 to download the custom pattern file from the host computer 110, and then store the downloaded custom pattern file in the controller 140. In certain embodiments, the downloaded custom pattern file may be stored either in the non-volatile memory 146 or in the volatile memory 144.

The LED control module 152 is a software application configured to control the blinking of the LEDs 165 in order to display the states of the storage drives 160 based on the blinking pattern data stored in the controller 140. For example, when the custom pattern file is stored in the controller 140, the LED control module 152 may generate control signals based on the custom LED blinking pattern data of the custom pattern file to control the blinking of the LEDs 165. On the other hand, when the custom pattern file does not exist in the controller 140, the LED control module 152 may generate control signals based on the default standard LED blinking pattern data to control the blinking of the LEDs 165. In certain embodiments, when the LED control module 152 determines that the custom pattern file exists in the controller 140 but is a corrupt file, the LED control module 152 may generate control signals based on the default standard LED blinking pattern data to control the blinking of the LEDs 165.

In certain embodiments, the non-volatile memory 146 of the controller 140 may define one or more memory blocks specifically for storing the LED blinking pattern data. For example, as shown in FIG. 3, two memory blocks are defined in the non-volatile memory 146, including a first memory block 180 and a second memory block 182. The first memory block 180 is used to store the default standard LED blinking pattern data, such as the IBPI standard LED blinking pattern data. The second memory block 182 is used to store the custom pattern file being downloaded by the downloading module 150.

Referring back to FIG. 1, the storage drives 160 are non-volatile storage media being controlled by the controller 140. In certain embodiments, the backplane/enclosure 130 may have slots for the storage drives 160 to be installed therein. Typically, a plurality of storage drives 160 may be provided in a backplane/enclosure 130, and each of the storage drives 160 may be designated with a label D(0), D(1), . . . , D(N−1), such that each storage drive 160 may correspond to a plurality of the LEDs 165. In certain embodiments, for example, each of the storage drives 160 may have 3 corresponding LEDs 165 for displaying the states of the storage drive 160. In certain embodiments, each of the storage drives 160 may be a HDD, a SSD, or any other types of storage media which may be controlled by the controller 140. It should be noted that, in some cases, some of the slots for the storage drives 160 may be empty (i.e., without a storage drive being installed therein), The LEDs 165 are display lights being used to display the state of the storage drives 160. Each of the LEDs 165 may be switchable between an ON state (i.e., the LED is on) and an OFF state (i.e., the LED is off), and may be controlled by the controller 140 to perform blinking to indicate the states of the storage drives 160. In certain embodiments, some or all of the LEDs 165 may form a virtual LED matrix, such that each row or each column of the LEDs 165 may correspond to one of the storage drives 160. It should be particularly noted that the virtual LED matrix is "virtual" because the LEDs 165 does not need to be physically arranged in a matrix arrangement. In other words, the LEDs 165 are arranged in the virtual LED matrix as a logical matrix, but the physical arrangement of the LEDs 165 may be in a non-matrix arrangement. For example, all the LEDs 165 may be physically aligned along a straight line. In certain embodiments, for distinguishing purposes, the LEDs 165 in different rows may be LEDs in different colors, such that a user may easily identify the corresponding drive states being displayed based on the color of the LEDs. For example, the LEDs 165 in the first row of the virtual LED matrix may be green LEDs, the LEDs 165 in the second row of the virtual LED matrix may be red LEDs, and the LEDs 165 in the third row of the virtual LED matrix may be yellow/amber LEDs. In certain embodiments, other combinations of the LEDs by types, colors, size and/or shape may be used for distinguishing purposes.

The BMC 170 is a specialized microcontroller that manages the interface between system management software and platform hardware. In certain embodiments, different types of sensors may be built into the host computer 110 where the BMC 170 is located, and the BMC 170 may read these sensors to obtain parameters such as temperature, cooling fan speeds, power status, operating system status, etc. Further, the BMC 170 may be configured to perform out-of-band (OOB) communications for the host computer 110. For example, the BMC 170 may communicate OOB with the controller 140.

The system interface 175 is a communication interface to perform data transfer between the host computer 110 and the BMC 170. In certain embodiments, the system interface 175 may be a typical standardized Intelligent Platform Management Interface (IPMI) system interfaces, such as a keyboard controller style (KCS) interface, a system management interface chip (SMIC) interface, or a block transfer (BT) interface. In certain embodiments, data transfer between the BMC 170 and the host computer 110 may be in the format of IPMI messages, which may go through the system interface 175 or any other interfaces between the BMC 170 and the host computer 110. For example, a universal serial bus (USB) interface, a PCIe bus, or any other communication bus may be used as the communication interface between the host computer 110 and the BMC 170.

As discussed above, to generate the custom pattern file, a user (e.g., the customer) may execute the conversion module 119 at the host computer 110 and provide a plurality of inputs, which represents the custom LED blinking pattern data. In response to the inputs, the conversion module 119 may convert the inputs to the custom pattern file containing the custom LED blinking pattern data. In certain embodiments, the conversion module 119 may provide a spreadsheet-like user interface (UI) having a plurality of cells, and each cell corresponds to one bit of data that represents the state of each of the LEDs 165 being ON or OFF for a certain period of time. For example, under the IBPI standard, each bit represents the state of a LED being ON or OFF for 125 ms, and the custom LED blinking pattern data may adopt the same standard.

Figure 4:
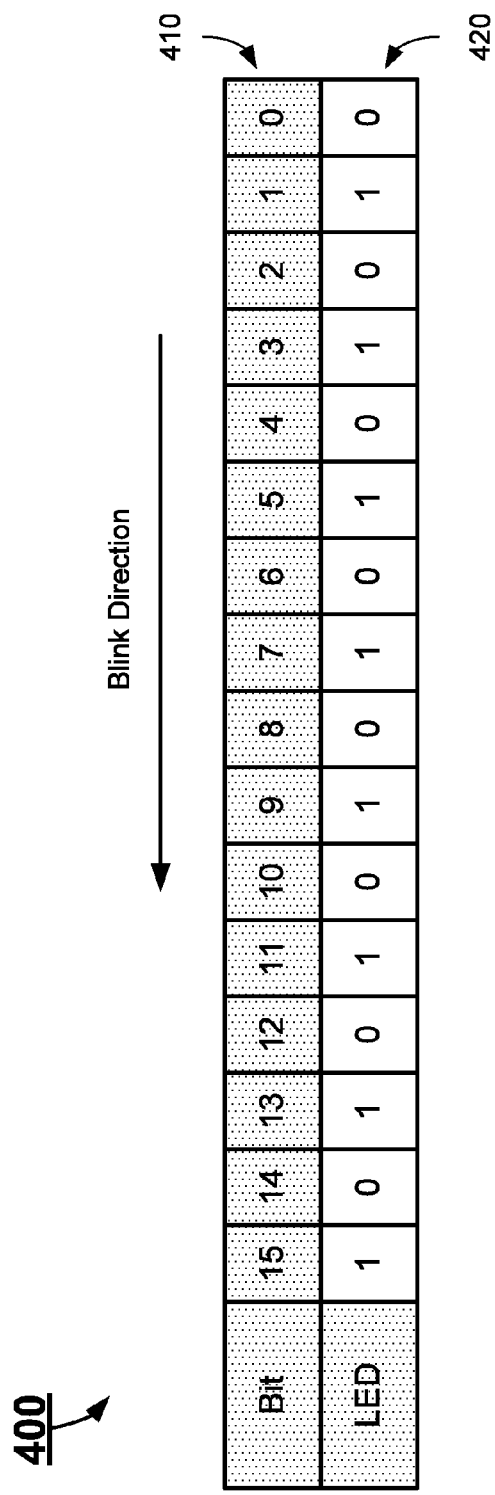
FIG. 4 schematically depicts a user interface of the conversion module according to certain embodiments of the present disclosure.

FIG. 4 schematically depicts a user interface of the conversion module according to certain embodiments of the present disclosure. As shown in FIG. 4, the table 400 includes a first row (which is the bit row) 410 and a second row (which is the signal row) 420. The bit row 410 shows a total of 16 bits, including the bits from 0 to 15 (listed from right to left as the blink direction). The signal row 420 includes a plurality of cells for the user to input either 0 or 1 as the signal. Each cell of the signal row 420 represents the state of the LED for 125 ms. In this way, the user may input, for each cell of the signal row 420, 0 to indicate the LED being switched to an OFF state for 125 ms, or 1 to indicate the LED being switched to an ON state for 125 ms. Thus, the value shown in the signal row 420 of FIG. 4 (10101010 10101010, or HEX value AAAAh) indicates that the LED will blink by switching OFF for 125 ms and then ON for 125 ms alternatively. In another example, if all cells of the signal row 420 are 0 (i.e., 00000000 00000000, or HEX value 0000h), the LED will maintain OFF. If all cells of the signal row 420 are 1 (i.e., 11111111 11111111, or HEX value FFFFh), the LED will maintain ON. Using such a UI 400, the user may input the desired custom blinking pattern data for one LED. Once the user inputs all of the blinking data for the LEDs, the conversion module 119 may convert the data to a HEX value, and generates the custom pattern file. In this way, the UI 400 of the conversion module 119 may allow the customer to have the visual feel of what the blinking will look like in the actual backplane/enclosure board 130.

FIG. 5 schematically depicts the data structure of a custom pattern file according to certain embodiments of the present disclosure. In particular, the data structure 500 of the custom pattern file as shown in FIG. 5 is identical to the data structure of a standard LED blinking pattern under the IBPI standard. As shown in FIG. 5, the custom pattern file includes 54 16-bit words (from Word 0 to Word 53), which is 108 bytes. In this case, the second memory block 182 must be 108 bytes or more. Each of the 16-bit word includes 2 bytes (16 bits) of data. The first 52 words of the custom pattern file refer to the custom LED blinking pattern data, which include unmated data and mated data. The 53-rd word of the custom pattern file is a 16-bit chip identification data of the controller 140. The last (54-th) word of the custom pattern file is a 16-bit checkbits data, which is used for checksum verification of the custom pattern file. As shown in FIG. 5, the value of the 16-bit checkbits data is shown as XXXX. In this case, the data of the custom pattern file as shown in FIG. 5 would be the HEX value of all 54 words, which would be: "AAAA00000000CC-CC0000FFFF000000000000F0F000000F0FF0F0000000-00000000 000000000000000000000000000000-000082AAAA00000000CCCC0000FFFF000000 000000F0F000000F0FF0F000000000FFFF000000-00000000000000FFFF00000000FFF F00029098XXXX."

In certain embodiments, the value XXXX of the 16-bit checkbits data may be determined by a formula. For example, the checksum may be:

Checksum=Word 0+Word 1+ . . . +Word 52+Word 53=0000h

In other words, the checksum verification may be done by adding the data of all 54 16-bit words, and the value XXXX of the 16-bit checkbits data may be determined accordingly.

Figure 6:
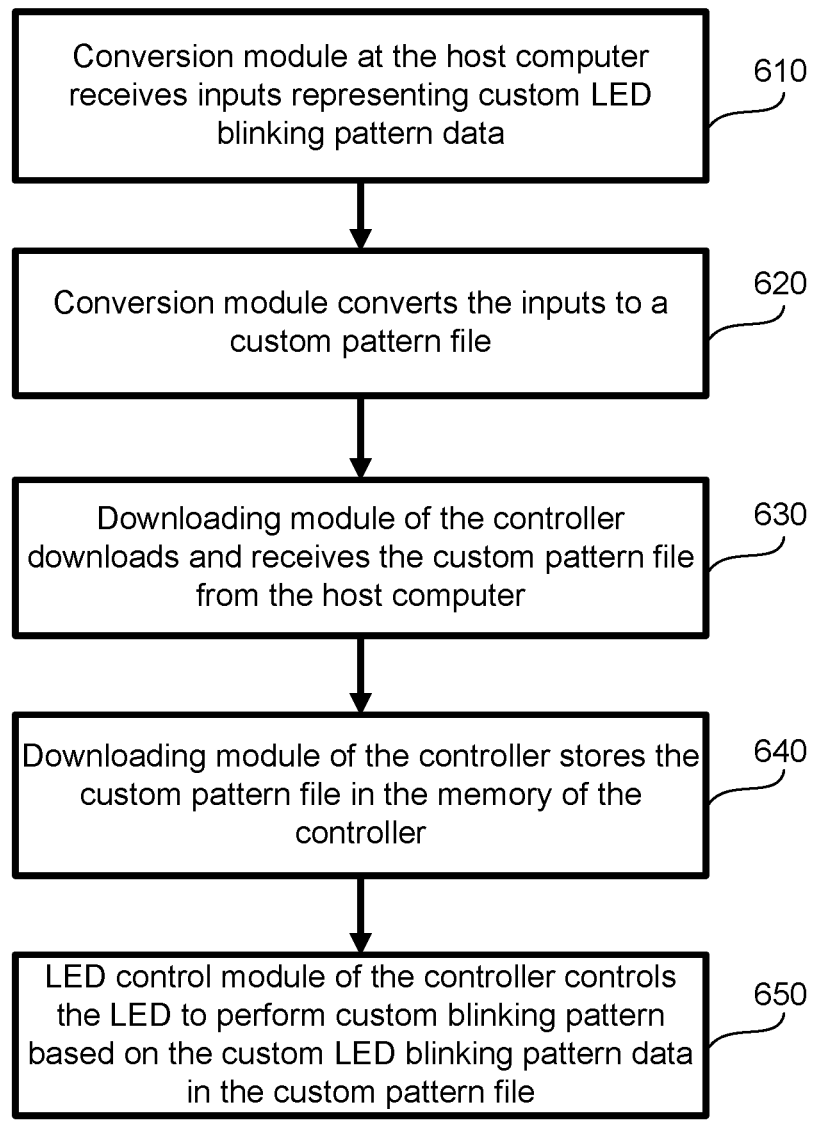
FIG. 6 depicts a flowchart of the operation of the system according to certain embodiments of the present disclosure.

FIG. 6 depicts a flowchart of the operation of the system according to certain embodiments of the present disclosure. In certain embodiments, the methods of the operation of the system may be implemented by a system to control the LEDs to display storage states. In certain embodiments, the method may be implemented by the host computer 110 and the controller 140 of the system 100 as shown in FIGS. 1-3. It should be particularly noted that, unless otherwise stated in the present disclosure, the steps of the method may be arranged in a different sequential order, and are thus not limited to the sequential order as shown in FIG. 6.

As shown in FIG. 6, at procedure 610, the conversion module 119 at the host computer 110 receives the inputs from the user, which represents the custom LED blinking pattern data. In certain embodiments, the user may use the UI as shown in FIG. 4 to input the data. At procedure 620, the conversion module 119 may convert the inputs to a custom pattern file, such as the file as shown in FIG. 5.

Once the custom pattern file is generated, at procedure 630, a user may operate the downloading module 150 of the controller 140 to download the custom pattern file from the host computer 110. Upon receiving the custom pattern file, at procedure 640, the downloading module stores the custom pattern file in the memory of the controller 140. For example, the custom pattern file may be stored in the second memory block 182 of the non-volatile memory 146 as shown in FIG. 3. Thus, at procedure 650, the LED control module 152 of the controller 140 may control the LED 165 to perform custom blinking pattern based on the custom LED blinking pattern data in the custom pattern file.

Figure 7:
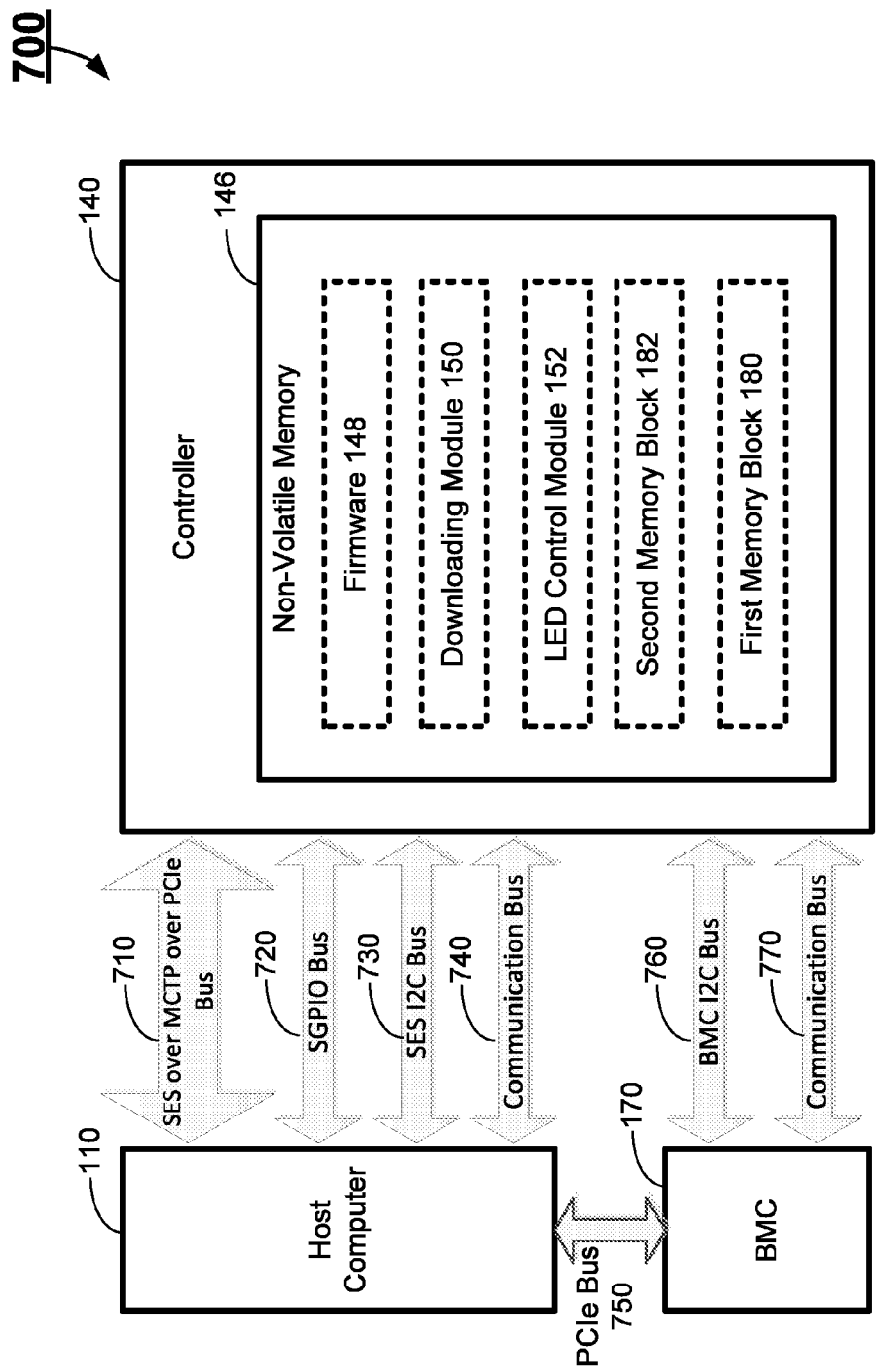
FIG. 7 schematically depicts the pattern download paths from the host computer to the controller according to certain embodiments of the present disclosure.

FIG. 7 schematically depicts the pattern download paths from the host computer to the controller according to certain embodiments of the present disclosure. In certain embodiments, since the system may provide multiple communication interfaces between the host computer 110 and the controller 140, the custom pattern file may be downloaded through any of the communication interfaces as the pattern download path. For example, to download the custom pattern file from the host computer 110 to the second memory block 182 of the controller 140, FIG. 7 shows multiple possible pattern download paths, including a path 710 through SES over MCTP over PCIe bus, a path 720 through the SGPIO bus, a path 730 through the SES I2C bus 730, and a path 740 through a communication bus, which can be any bus. Alternatively, in certain embodiments, the custom pattern file may be downloaded from the host computer 110 to the second memory block 182 of the controller 140 via the BMC 170. For example, the download path may be through the PCIe bus 750 between the host computer 110 and the BMC 170, and then through the BMC I2C bus 760, or through the communication bus 770 between the BMC 170 and the controller 140. In any cases, the downloading module 150 may store the downloaded custom pattern file in the second memory block 182.

As shown in FIGS. 3 and 7, the non-volatile memory 146 of the controller 140 defines two memory blocks (first memory block 180 and second memory block 182) specifically for storing the LED blinking pattern data, in which the first memory block 180 is used to store the default standard LED blinking pattern data, and the second memory block 182 is used to store the custom pattern file being downloaded by the downloading module 150. In certain embodiments, however, it is possible that the non-volatile memory 146 of the controller 140 may include only one memory block. In this case, the memory block stores the default standard LED blinking pattern data. When the downloading module 150 downloads the custom pattern file, the controller 140 may store the custom pattern file in the one memory block to replace the standard LED blinking pattern data.

Further, as shown in FIGS. 3 and 7, the memory blocks (first memory block 180 and second memory block 182) are defined in the non-volatile memory 146 of the controller 140. In certain embodiments, however, the memory blocks may be defined in the volatile memory 144 of the controller 140. In this case, the downloaded custom pattern file may be stored in the volatile memory 144 instead of the non-volatile memory 146.

Figure 8:
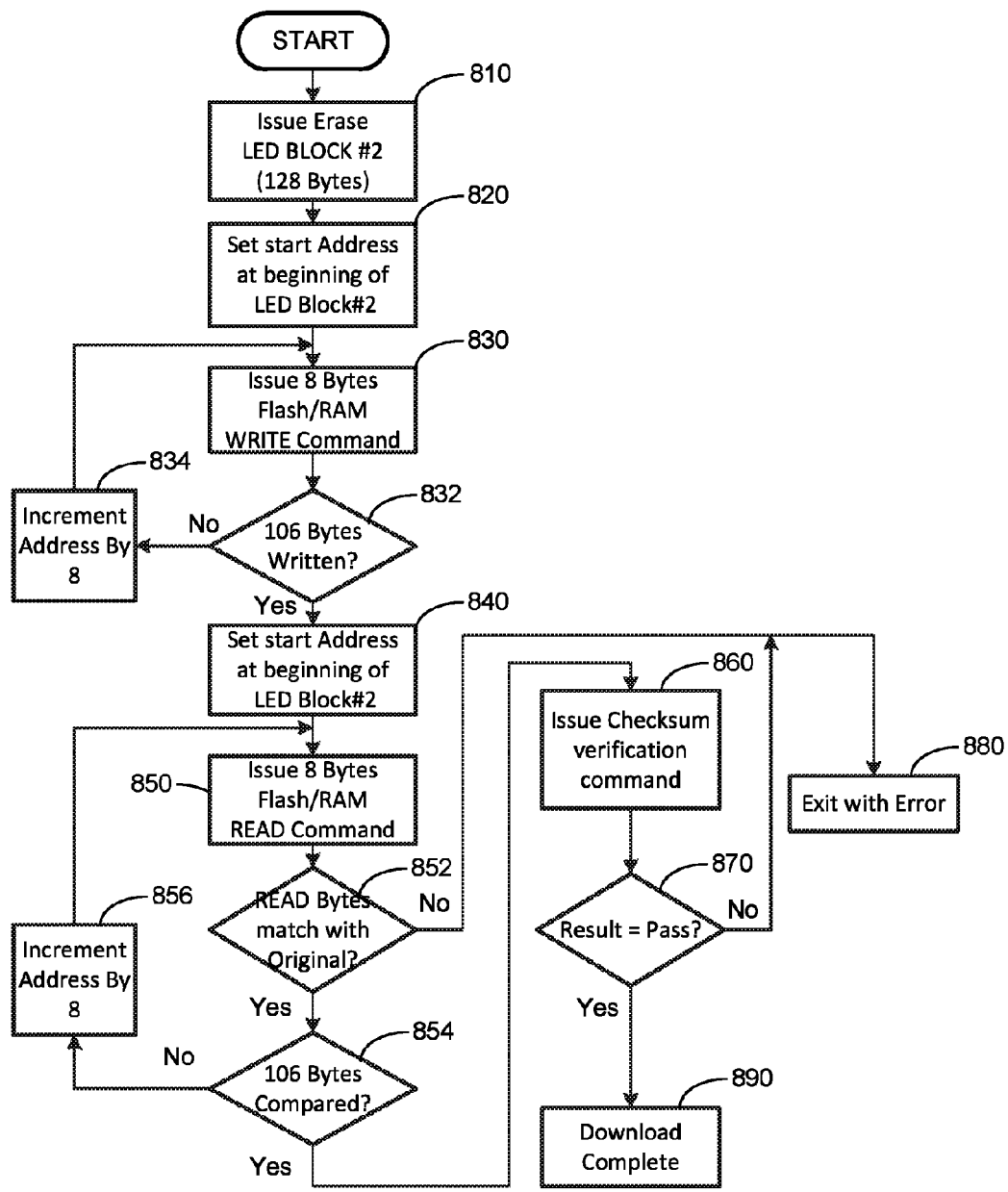
FIG. 8 depicts a flowchart of the operation of the downloading module according to certain embodiments of the present disclosure.

FIG. 8 depicts a flowchart of the operation of the downloading module according to certain embodiments of the present disclosure. In certain embodiments, the methods of the operation of the downloading module 150 may be implemented by the downloading module 150 as shown in FIGS. 3 and 7, and the custom pattern file being downloaded is a 108-byte file as shown in FIG. 5. It should be particularly noted that, unless otherwise stated in the present disclosure, the steps of the method may be arranged in a different sequential order, and are thus not limited to the sequential order as shown in FIG. 8.

When the downloading process starts, the downloading module 150 may start by erasing the second memory block 182, and writing the data of the custom LED blinking pattern into the second memory block 182. At procedure 810, the downloading module 150 may issue an erase command to erase the LED block #2 (i.e., the second memory block 182). In this case, the LED block #2 is 128 bytes, which is sufficient to store the custom LED blinking pattern data and the chip identification (106 bytes) of the custom pattern file. At procedure 820, the downloading module 150 sets the start address at the beginning of the LED block #2. Then, at procedure 830, the downloading module 150 issues a 8 bytes flash/RAM WRITE command to start writing the data (106 bytes) of the custom pattern file into the LED block #2. At procedure 832, the downloading module 150 checks if all 106 bytes of the custom LED blinking pattern data are written. If not, at procedure 834, the downloading module 150 would increment address by 8, and return to procedure 830 to perform the WRITE command. If all 106 bytes of data are written, the downloading module 150 may further proceed to procedure 840.

When all 106 bytes of the data are written in the LED block #2, the downloading module 150 may verify whether the data written is correct. At procedure 840, the downloading module 150 would again set the start address at the beginning of the LED block #2. Then, at procedure 850, the downloading module 150 issues a 8 bytes flash/RAM READ command to start reading the data (106 bytes) being written in the LED block #2. At procedure 852, the downloading module 150 checks if the READ bytes matches with the original data bytes. If there is a match, the downloading module proceed to procedure 854. If the data does not match, the downloading module proceed to procedure 880 to exit with an error. At procedure 854, the downloading module 150 checks if all 106 bytes of the custom LED blinking pattern data are compared. If not, at procedure 856, the downloading module 150 would increment address by 8, and return to procedure 850 to perform the READ command. If all 106 bytes of data are compared, the downloading module 150 may further proceed to procedure 860. At procedure 860, the downloading module 150 issues checksum verification command to perform checksum verification of the data. At procedure 870, the downloading module 150 determines whether the result of the checksum verification is pass. If the result is pass (meaning checksum verification is successful), the downloading module 150 may proceed to procedure 890 to complete the downloading process. If the result is fail (meaning checksum verification is unsuccessful), the downloading module proceed to procedure 880 to exit with an error.

Figure 9:
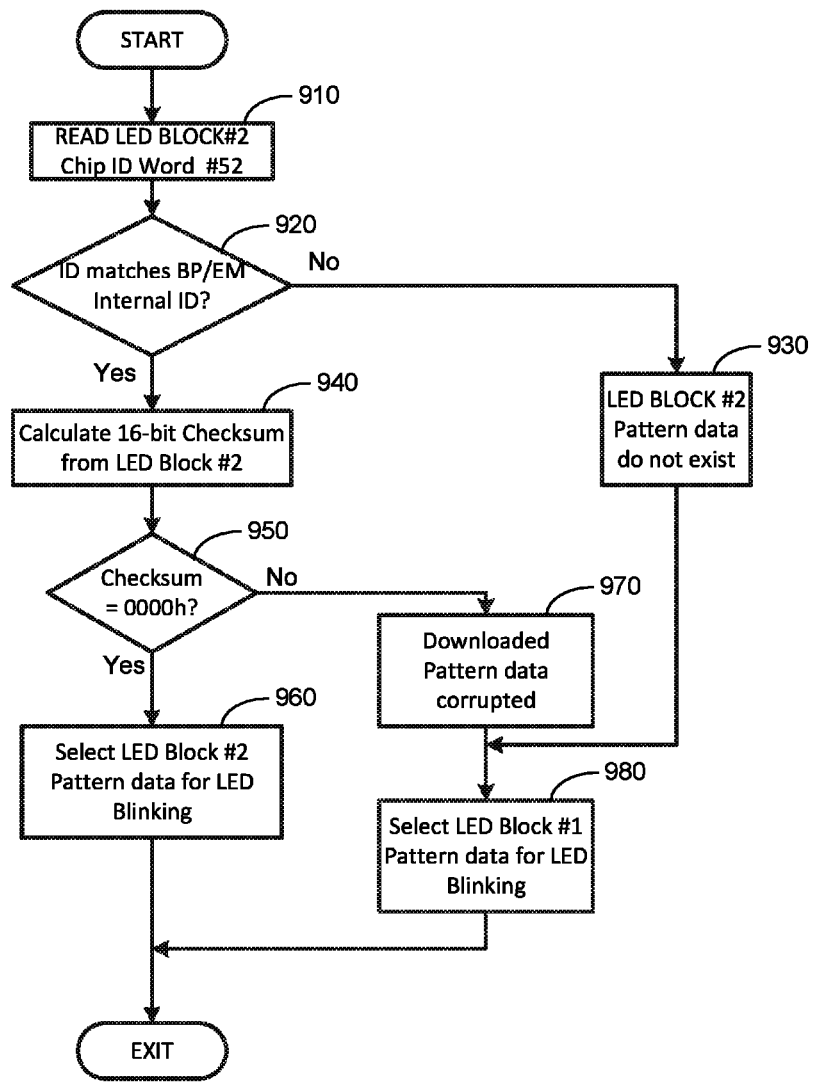
FIG. 9 depicts a flowchart of the operation of the LED control module according to certain embodiments of the present disclosure.

FIG. 9 depicts a flowchart of the operation of the LED control module according to certain embodiments of the present disclosure. In certain embodiments, the methods of the operation of the LED control module 152 may be implemented by the LED control module 152 as shown in FIGS. 3 and 7, and the custom pattern file is stored in the LED block #2 (i.e., the second memory block 182) as described in the flowchart of FIG. 8. It should be particularly noted that, unless otherwise stated in the present disclosure, the steps of the method may be arranged in a different sequential order, and are thus not limited to the sequential order as shown in FIG. 9.

When the control process starts, the LED control module 152 may start by checking whether the custom LED blinking pattern exists in the LED block #2 (i.e., the second memory block 182). At procedure 910, the LED control module 152 reads the data of the chip identification (Word #52) from the LED block #2. At procedure 920, the LED control module 152 compares the data of the chip identification with the internal id of the backplane/enclosure provided by the controller 140. If the id matches, the LED control module 152 may determine that the pattern data exists in the LED block #2, and then proceed to procedure 940. On the other hand, if the id does not match, the LED control module 152 may proceed to procedure 930 to determine that the pattern data does not exist in the LED block #2. At procedure 980, the LED control module 152 would then select the LED block #1 (i.e., the first memory block 182), which stores the default standard LED blinking pattern data for LED blinking.

Once the LED control module 152 determine that the pattern data exists in the LED block #2, at procedure 940, the LED control module 152 may calculate the 16-bit checksum value from the data in the LED block #2. At procedure 950, the LED control module 152 may determine whether the checksum value is 0000h. If so (meaning checksum verification is successful), at procedure 960, the LED control module 152 would select the LED block #2 (i.e., the second memory block 182), which stores the custom LED blinking pattern data for LED blinking. On the other hand, if checksum value is not 0000h (meaning checksum verification is unsuccessful), the LED control module 152 may proceed to procedure 970 to determine that the downloaded pattern data is corrupted. At procedure 980, the LED control module 152 would then select the LED block #1 (i.e., the first memory block 182), which stores the default standard LED blinking pattern data for LED blinking.

In a further aspect, the present disclosure is related to a non-transitory computer readable medium storing computer executable code. The code, when executed at a processer of a controller, may perform the method as described above. In certain embodiments, the non-transitory computer readable medium may include, but not limited to, any physical or virtual storage media storing the firmware of the controller. In certain embodiments, the non-transitory computer readable medium may be implemented as the storage device 116 of the host computer and/or the non-volatile memory 146 of the controller 140 as shown in FIGS. 2 and 3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method of providing a downloadable custom light emitting diode (LED) blinking pattern for a controller, comprising:
   providing a backplane enclosure system comprising:
   a controller comprising a processor and a memory;
   a plurality of storage drives electrically connected to and controlled by the controller;

a plurality of LEDs electrically connected to the controller, wherein each of the LEDs is controlled by the controller to be switchable between an ON state and an OFF state such that the LEDs are configured to perform blinking to indicate a plurality of states of the storage drives; and a computing device communicatively connected to the controller via a communication interface;

receiving, by a conversion module of the computing device, a plurality of inputs representing custom LED blinking pattern data;

converting, by the conversion module of the computing device, the inputs to a custom pattern file containing the custom LED blinking pattern data;

receiving, by a downloading module of the controller, the custom pattern file from the computing device via the communication interface;

storing, by the downloading module of the controller, the custom pattern file in the memory; and controlling, by the controller, the LEDs to perform a custom blinking pattern based on the custom LED blinking pattern data in the custom pattern file.

2. The method as claimed in claim 1, wherein the communication interface is a SES I2C bus, a PCIe bus, or a communication bus.

3. The method as claimed in claim 1, wherein the controller is a microcontroller based controller, a complex programmable logic device (CPLD) based controller, a field-programmable gate array (FPGA) based controller, or any combination thereof.

4. The method as claimed in claim 1, wherein the custom pattern file comprises:
the custom LED blinking pattern data;
chip identification data of the controller; and
checkbits data used for checksum verification of the custom pattern file.

5. The method as claimed in claim 1, wherein the memory stores default standard LED blinking pattern data, and the method further comprises:
controlling, by the controller, the LEDs to perform a standard blinking pattern based on the default standard LED blinking pattern data when the custom pattern file is unavailable in the memory.

6. The method as claimed in claim 5, wherein the memory defines a plurality of memory blocks, comprising:
a first memory block storing the default standard LED blinking pattern data; and
a second memory block configured to store the custom pattern file.

7. The method as claimed in claim 6, wherein the controller is configured to control the LEDs by:
checking the second memory block to determine whether the custom pattern file is available in the second memory block;
when the custom pattern file is available in the second memory block, validating the custom pattern file;
when the custom pattern file is validated, controlling the LEDs to perform the custom blinking pattern based on the custom pattern file stored in the second memory block; and
when the custom pattern file is unavailable in the second memory block, or when the custom pattern file is not successfully validated, controlling the LEDs to perform the standard blinking pattern based on the default standard LED blinking pattern data stored in the first memory block.

8. The method as claimed in claim 5, wherein the memory comprises one memory block storing the default standard LED blinking pattern data, and the controller is configured to store the custom pattern file in the one memory block to replace the standard LED blinking pattern data.

9. The method as claimed in claim 1, wherein the controller is an enclosure management controller or a backplane controller.

10. A system, comprising:
a controller comprising a processor and a memory storing computer executable code;
a plurality of storage drives electrically connected to and controlled by the controller; and
a plurality of light emitting diodes (LEDs) electrically connected to the controller, wherein each of the LEDs is controlled by the controller to be switchable between an ON state and an OFF state such that the LEDs are configured to perform blinking to indicate a plurality of states of the storage drives;
wherein the computer executable code, when executed at the processor, is configured to:
receive a custom pattern file containing custom LED blinking pattern data;
store the custom pattern file in the memory; and
control the LEDs to perform a custom blinking pattern based on the custom LED blinking pattern data in the custom pattern file.

11. The system as claimed in claim 10, further comprising a computing device communicatively connected to the controller via a communication interface, wherein the computing device comprises a conversion module configured to:
receive a plurality of inputs representing the custom LED blinking pattern data; and
convert the inputs to the custom pattern file.

12. The system as claimed in claim 10, wherein the controller is a microcontroller based controller, a complex programmable logic device (CPLD) based controller, a field-programmable gate array (FPGA) based controller, or any combination thereof.

13. The system as claimed in claim 10, wherein the custom pattern file comprises:
the custom LED blinking pattern data;
chip identification data of the controller; and
checkbits data used for checksum verification of the custom pattern file.

14. The system as claimed in claim 10, wherein the memory stores default standard LED blinking pattern data, and the computer executable code is further configured to:
control the LEDs to perform a standard blinking pattern based on the default standard LED blinking pattern data when the custom pattern file is unavailable in the memory.

15. The system as claimed in claim 14, wherein the memory defines a plurality of memory blocks, comprising:
a first memory block storing the standard LED blinking pattern data; and
a second memory block configured to store the custom LED blinking pattern data,
wherein the computer executable code is configured to control the LEDs by:
checking the second memory block to determine whether the custom pattern file is available in the second memory block;
when the custom pattern file is available in the second memory block, validating the custom pattern file;

when the custom pattern file is validated, controlling the LEDs to perform the custom blinking pattern based on the custom pattern file stored in the second memory block; and when the custom pattern file is unavailable in the second memory block, or when the custom pattern file is not successfully validated, controlling the LEDs to perform the standard blinking pattern based on the default standard LED blinking pattern data stored in the first memory block.

16. A system, comprising:

a backplane enclosure, comprising a plurality of light emitting diodes (LEDs) and a controller configured to control blinking of the LEDs; and a computing device communicatively connected to the controller via a communication interface, wherein the computing device comprises a processor and a storage device having a conversion module, wherein the conversion module, when executed at the processor of the computing device, is configured to:

receive a plurality of inputs representing custom LED blinking pattern data; and convert the inputs to a custom pattern file containing the custom LED blinking pattern data, such that the custom pattern file is downloadable to the controller to control blinking of the LEDs.

17. The system as claimed in claim 16, wherein the custom pattern file comprises:

the custom LED blinking pattern data;

chip identification data of the controller; and checkbits data used for checksum verification of the custom pattern file.

18. The system as claimed in claim 17, wherein a number of the LEDs is N, N being a positive integer greater than 1, and the custom LED blinking pattern data of the custom pattern file comprises N*2 bytes of data.

19. The system as claimed in claim 16, wherein the controller comprises a processor and a memory storing computer executable code, wherein the computer executable code, when executed at the processor of the controller, is configured to:

receive the custom pattern file from the computing device via the communication interface;

store the custom pattern file in the memory; and control the LEDs to perform a custom blinking pattern based on the custom LED blinking pattern data in the custom pattern file.

20. The system as claimed in claim 19, wherein the memory of the controller defines a plurality of memory blocks, comprising:

a first memory block storing the standard LED blinking pattern data; and a second memory block configured to store the custom LED blinking pattern data, wherein the computer executable code is configured to control the LEDs by:

checking the second memory block to determine whether the custom pattern file is available in the second memory block;

when the custom pattern file is available in the second memory block, validating the custom pattern file;

when the custom pattern file is validated, controlling the LEDs to perform the custom blinking pattern based on the custom pattern file stored in the second memory block; and when the custom pattern file is unavailable in the second memory block, or when the custom pattern file is not successfully validated, controlling the LEDs to perform the standard blinking pattern based on the default standard LED blinking pattern data stored in the first memory block.

* * * * *